United States Patent

Nozawa

[11] Patent Number: 4,644,209
[45] Date of Patent: Feb. 17, 1987

[54] CUP-SHAPED WINDING AND METHOD OF FABRICATING SAME

[75] Inventor: Yoshikuni Nozawa, Nagano, Japan

[73] Assignee: Entac Co., Ltd., Nagano, Japan

[21] Appl. No.: 660,835

[22] Filed: Oct. 15, 1984

[30] Foreign Application Priority Data

Oct. 15, 1983 [JP] Japan .................. 58-193040

[51] Int. Cl.$^4$ ............................................. H02K 3/00
[52] U.S. Cl. ............................. 310/198; 310/206; 310/266
[58] Field of Search .............. 310/40 MM, 180, 184, 310/266, 154, 198–208, 42, 268; 29/598, 605; 322/90

[56] References Cited

U.S. PATENT DOCUMENTS

| | | | |
|---|---|---|---|
| 2,513,410 | 7/1950 | Haydon | 310/40 R |
| 3,191,081 | 6/1965 | Faulhaber | 310/40 MM |
| 3,356,877 | 12/1967 | Burr | 310/266 |
| 4,320,319 | 3/1982 | Takahashi | 310/266 |
| 4,323,806 | 4/1982 | Aoki | 310/266 |
| 4,327,304 | 4/1982 | Aoki | 310/266 |
| 4,337,568 | 7/1982 | Morisawa | 310/266 |
| 4,341,973 | 7/1982 | Maruko | 310/206 |
| 4,437,028 | 3/1984 | Ikeda | 310/266 |
| 4,476,409 | 10/1984 | Fukami | 310/198 |

FOREIGN PATENT DOCUMENTS

| | | | |
|---|---|---|---|
| 0000952 | 2/1964 | Japan | 310/198 |
| 0078104 | 7/1974 | Japan | 310/268 |
| 0062954 | 4/1982 | Japan | 310/198 |
| 0118015 | 7/1982 | Japan | 310/198 |
| 0206412 | 11/1982 | Japan | 310/198 |
| 0182440 | 10/1983 | Japan | 310/198 |

*Primary Examiner*—R. Skudy
*Attorney, Agent, or Firm*—Sughrue, Mion, Zinn, Macpeak, and Seas

[57] ABSTRACT

A cup-shaped winding for use in the rotor or stator of a motor such as a coreless motor or slotless motor makes use of leakage flux as well as magnetic flux in the main direction. The cup-shaped winding consists of wire bands which are lap wound such that they are successively shifted a given angle from one another about the rotating shaft of a core. The winding is shaped into a cylinder or cone. The portion of each wire band which is on the bottom of the cylinder or cone does not surround the rotating shaft and forms two sides that meet at a vertex lying on the periphery of the rotating shaft. The portion of each wire band which is on the curved surface of the cylinder or cone are inclined away from the rotating shaft.

13 Claims, 18 Drawing Figures

CUP-SHAPED WINDING AND METHOD OF FABRICATING SAME

FIELD OF THE INVENTION

The present invention relates to a cup-shaped winding for use in the rotor or stator of a coreless motor, slotless motor, brushless motor, or other motor and to a method of fabricating it.

BACKGROUND OF THE INVENTION

Heretofore, motors which use a small-sized, thin and short-cylindrical or flat winding and permanent magnets for producing a magnetic field generally have had the magnets installed within the winding. In a brushless motor, permanent magnets are included in a fixed winding and caused to rotate. The brushless motor is essentially the same in relative arrangement as coreless motors and slotless motors where a winding is rotated. Accordingly, a motor in which magnets for developing a magnetic field are fixed is hereinafter described.

In a motor having a winding in the form of a short cylinder, magnetic flux produced in the gaps between the magnets lies chiefly radially, but it does not exist on the end surfaces on which the magnets are installed. In the open end surfaces opposite to these end surfaces, leakage flux that accounts for about 10 to 20% is developed axially. In a motor having a flat winding, magnetic flux is set up mainly axially, and leakage flux that accounts for about 10 to 20% of the magnetic flux is generated radially. In the prior art, these leakage fluxes have not been positively employed. For instance, the winding disclosed in U.S. Pat. No. 3,191,081 is a hollow cylinder, and therefore it can in no way make use of the axial leakage flux. The winding shown in U.S. Pat. No. 2,513,410 takes the form of a cylinder having shoulder and bottom portions. In the peripheral regions close to the axis, stringlike wire elements overlap one another, so that the axial air gaps become too large. Also, it is not expected that the leakage flux is employed by taking the axial component corresponding to the field poles. Further, the winding disclosed in Japanese Patent Publication No. 952/1964 is not able to make use of the radial leakage flux, because it is a flat disk adopting an involute. In addition, the winding in the form of printed coils disclosed in Japanese Patent Laid-Open Application No. 78104/1974 is not capable of utilizing the radial leakage flux, because it is a flat disk bordered with inner and outer ribs.

SUMMARY OF THE INVENTION

It is an object of the present invention to provide a cup-shaped winding which can effectively use both magnetic flux lying in the main direction and leakage flux.

It is another object of the invention to provide a method of fabricating such a cup-shaped winding.

These objects are achieved, in accordance with the invention, by a cup-shaped winding comprising: wire bands each of which consists of a plurality of turns of wire element; the wire bands being lap wound on each other such that they are successively shifted a given angle from each other about the rotating shaft of the winding, a central axis of the winding passing through the rotating shaft; two sides, a third side opposite those two sides, and the intermediate portions of the wire bands connecting the two sides with the third side being formed on the bottom, the opening portion, and the curved surface, respectively, of a cylinder or cone, the corresponding opening portion of the winding being the "lip" portion of the cup the portion of each wire band which is on the bottom portion not surrounding the rotating shaft and forming said two sides that meet at a vertex lying on the periphery of the rotating shaft; the third side which is effectively the "lip" of the cup lying opposite the vertex; the intermediate portions of each wire band which is on the curved surface being inclined away from the direction of the shaft. This cup-shaped winding is produced by the steps of: pressing a pair of pressure rollers against the fringe of the bottom of a cylindrical or conic core around which wire elements are wound, the pressure rollers being spaced a given angle apart; attaching an attachment roller firmly to the curved surface of the core between the pressure rollers or placing a retaining means on the curved surface of the core such that it can disengage from the surface; mounting a spiral member near the bottom of the core such that it can rotate about the axis of the core, the spiral member having an open end, the pressure rollers, the attachment roller or the retaining means, and the spiral member offering locations at which the wire elements are engaged; guiding each wire element from the inside of the spiral member across one of the pressure rollers, across either the attachment roller or the retaining means, and then across the other pressure roller to the inside of the spiral member and training it around these components a plurality of times in this way to form wire bands; and moving the wire bands through given partial revolutions around the core in such a way that these bands are lap wound.

By constructing the cup-shaped winding as described above, it is disposed corresponding to both magnetic flux lying in the main direction and leakage flux, thus permitting effective utilization of these two magnetic fluxes. This will contribute to the rotating force of a motor in which the cup-shaped winding is mounted.

The rotating force T of a motor shown in FIGS. 1 and 2 is formed in the manner described below. Referring to FIG. 4, it is now assumed that a cup-shaped winding 200 has an outside radius of a, an inside radius of b, and an axial length of l. After this winding has been disposed so as to be surrounded by a casing 3 and magnets 4 as shown in FIG. 3, when it is rotated, the rotating force $\tau$ produced in one lead wire is given by $\tau = \tau_1 + \tau_2$ where $\tau_1$ is the rotating force contributing to the axial magnetic flux, and $\tau_2$ is the rotating force contributing to the radial magnetic flux. More specifically, $T_1$ is given by $$\tau_1 = \frac{\pi(a^2 - b^2)BI}{2\pi P}, \quad \pi(a^2 - b^2) = S_1$$

$$= \frac{S_1 BI}{2\pi P}$$

where B is the magnetic flux density in a gap, I is the current appearing at ends of the winding, P is the number of circuits arranged in parallel relation, I/P is the current flowing into the lead wire, and $S_1$ is the area of a gap through which the axial magnetic flux passes.

$$\tau_2 = \frac{2\pi a l B I}{2\pi P}, \quad 2\pi a l = S_2$$

-continued $$= \frac{S_2 BI}{2\pi P}$$

where $S_2$ is the area of a gap through which the radial magnetic flux passes. The rotating force can also be expressed as follows.

$$\tau = \tau_1 + \tau_2 = \frac{(S_1 + S_2)BI}{2\pi P}, S_1 + S_2 = S_0$$

$$= \frac{S_0 BI}{2\pi P}$$

where $S_0$ is the total area of all the gaps through which magnetic flux passes. Thus, the rotating force T produced in Z lead wires is given by $$T = \frac{S_0 BZI}{2\pi P}, I = I_s - I_e$$

$$= \frac{S_0 BZ}{2\pi P}(I_s - I_e)$$

where $I_s = V/R$ is the starting current, $I_e = V_e/R$ is the counter-generating current, V is the terminal voltage, R is the armature resistance, and $V_e$ is the back electromotive voltage. The above formula is modified as:

$$T = \frac{S_0 BZ}{2\pi P} \cdot \frac{(V - V_e)}{R}, V_e = \frac{S_0 BZ}{P} N$$

where N is the rotational frequency that can be changed at will.

The rotating force T is obtained when each wire band consisting of windings of lead wire or wire element assumes an ideal form as described in detail later. The rotating force T produced by an ordinary motor is also given by $$T = \frac{KS_0 BZ}{2\pi P} \cdot \frac{V - V_e}{R}, K = \frac{S}{S_0}$$

where K is the winding factor, and S is the effective area in which torque is produced, the area depending on the form of the winding.

The magnetic flux produced in the field of a motor that uses a cup-shaped winding as mentioned above now will be discussed. Where the cup-shaped winding takes the form of a short cylinder as shown in FIG. 2, the magnetic flux in the main direction is produced radially. On the end surfaces on which magnets are mounted, no magnetic flux is developed, but on the open end surfaces which are opposite to the end surfaces, axial leakage flux that accounts for about 10 to 20% of the magnetic flux is created. On the other hand, where the cup-shaped winding is flat as shown in FIG. 1, the magnetic flux in the main direction is produced axially unlike the aforementioned winding in the form of a short cylinder, and about 10 to 20% of leakage flux is developed radially.

The present invention provides a cup-shaped winding whose shape corresponds to both the magnetic flux in the main direction and leakage flux to increase the winding factor K mentioned above, for obtaining a motor producing a large rotating force. For this purpose, the shape of the portion of each wire band which is on the bottom surface of the cup-shaped winding is so formed that two sides extend radially such that they are spaced apart a given vertical angle about the central axis of the winding passing through the rotating shaft on which wire elements are wound as described previously. The shape of the portion of each wire band which is on the curved surface of the cup-shaped winding is so formed that it is tilted away from the shaft. The portion of each wire band which is on the opening portion of the cup-shaped winding extends circumferentially, like a part of the lip of a cup. Thus, it is desired that the shape obtained by projecting the winding onto an axial plane bears the closest resemblance to a rectangle.

The present inventors have already proposed a part of these techniques in Japanese Patent Application Nos. 62954/1982, 118015/1982 and 206412/1982, the latter two of which are incorporated in the pending applications of U.S. Ser. No. 511,687 filed on July 7, 1983 and 592,779 filed on Mar. 26, 1984. Allowable subject matter was indicated in U.S. Ser. No. 511,687 on Nov. 23, 1984. The present invention provides a cup-shaped winding capable of increasing the value of the winding factor K further as well as a method of fabricating it.

DETAILED DESCRIPTION OF THE INVENTION

Figure 5:
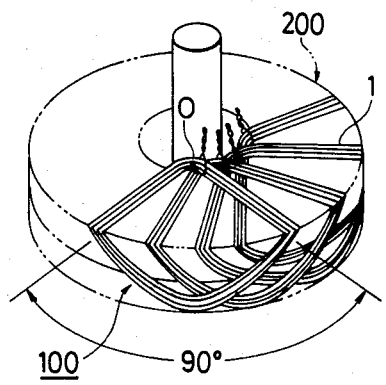
FIG. 5 is a perspective view of a winding for a four-pole motor according to the present invention.
Figure 6:
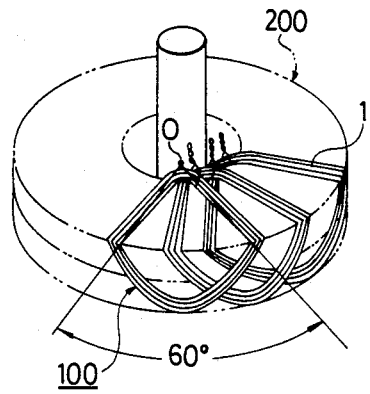
FIG. 6 is a perspective view of a winding for a six-pole motor according to the invention.
Figure 7:
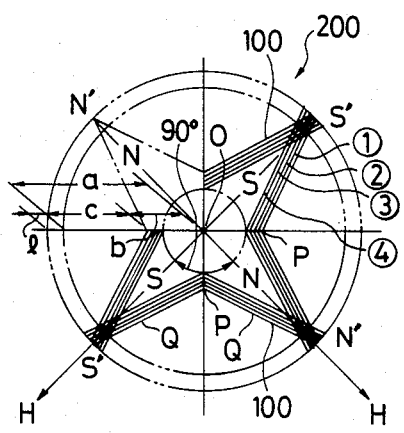
FIGS. 7 and 8 are views for illustrating the winding according to the invention.
Figure 8:
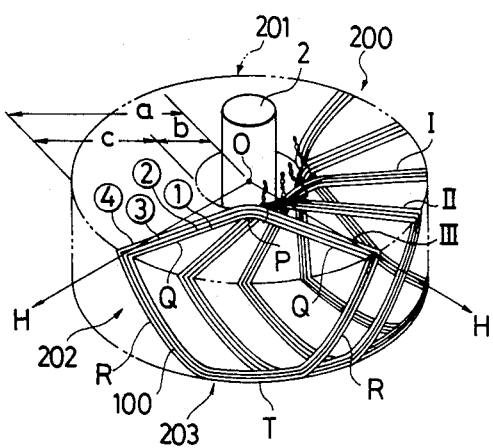

Referring now to FIGS. 7 and 8, a cup-shaped winding 200 is fabricated by lap winding wire bands 100 in such a way that these bands 100 are successively shifted through given partial revolutions about a rotating shaft 2 as indicated by I, II, III, etc. Each wire band 100 is produced by winding wire elements 1 (as shown in FIGS. 5 and 6), each having a deposition line, and being wound a plurality of times in parallel relation as indicated by (1), (2), (3), (4), etc.

The bottom portion of each wire band 100 is so formed that two sides Q extend from a vertex which is at a point P on the periphery of the rotating shaft 2, a central axis of the winding passing through the shaft 2, and that this shaft 2 is not surrounded by this bottom portion. The two sides Q meet their respective reference lines H at the periphery of the winding, the reference lines forming a given central angle. The portions of each wire band which are on the curved surface 202 of the winding has two sides R which are inclined to the axial direction. Each wire band 100 has a third side T extending peripherally on the opening portion 203 of the winding, as if it were a part of the lip of the cup which is the shape of the overall winding.

The two sides Q forming the bottom of each wire band 100 are now described in greater detail by referring to FIGS. 7 and 8. The vertex P lies on the periphery of the rotating shaft 2. The angle formed by the two sides Q is, in reality, made somewhat larger than the given central angle formed between the reference lines H to permit the shaft 2 to be firmly secured in the center and also to provide a space for connections from taps. The wire elements 1 are wound in parallel relation as indicated by (1), (2), (3), etc. so as not to increase the thickness of each wire band 100. These wire bands 100 are lap wound such that they are successively shifted through a given partial turn or revolution from each other. The intermediate portions R and third side T forming the curved portion and the opening portion, respectively, are so formed that the contour formed by projecting the wire band onto an axial plane closely resembles a rectangle. In order to make the winding operation efficient, the portions R are inclined away from the rotating shaft 2 or to the axial direction, and the third side T is made to extend along the periphery. The central angle formed between the reference lines H, which provide the basis for the two sides Q on the bottom portion 201, is determined by the number of the field poles. Where the number of the field poles is four, the central angle is 90° (see FIG. 5). Where the number is six, the central angle is 60° (see FIG. 6).

Figure 1:
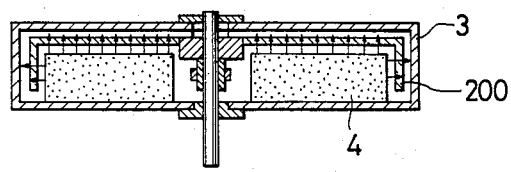
FIG. 1 is a vertical cross section of a motor incorporating a flat-type cup-shaped winding.

The cup-shaped winding in these examples is flat in the same manner as in FIG. 1. Therefore, the magnetic flux in the main direction is generated axially, while leakage flux is produced radially. Accordingly, the two sides Q on the bottom portion 201 form the given central angle and correspond to the main direction magnetic flux developed by the field poles. The two inclined intermediate portions R on the curved surface 202 correspond to the leakage flux. Consequently, the cup-shaped winding 200 in these examples effectively utilizes both the magnetic flux in the main direction and the leakage flux.

Figure 2:
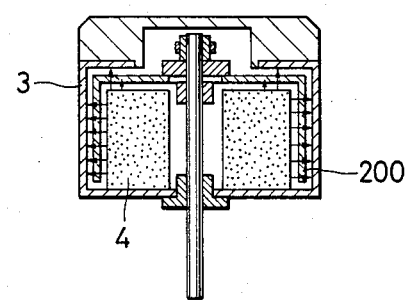
FIG. 2 is a vertical cross section of a motor incorporating a cup-shaped winding in the form of a short cylinder.
Figure 3:
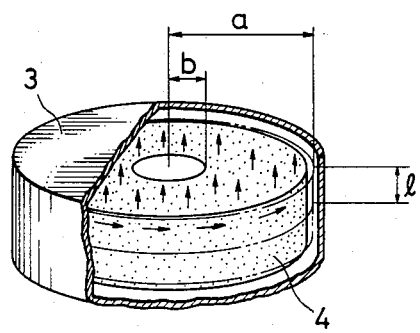
FIGS. 3 and 4 are views for illustrating the rotating force of a motor.
Figure 4:
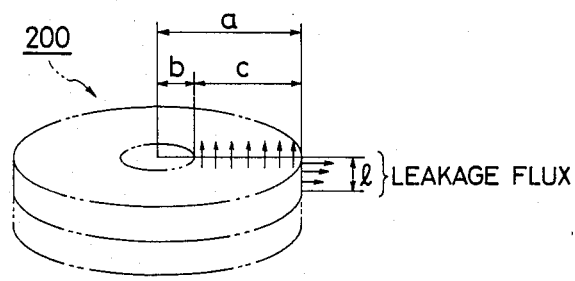

In the cup-shaped winding in the form of a short cylinder as shown in FIG. 2, the height of the cylindrical shape of the winding is less than the diameter of the winding. As a result, the magnetic flux in the main direction and leakage flux are in reversed relation to the foregoing winding, but it can also effectively make use of both fluxes. The present inventor has found that the winding factor of these windings is improved by more than ten percent over arrangements which cannot take advantage of leakage flux. Where field coils for four poles are used, the central angle formed between the reference lines H, which provides the basis for the two sides Q, is 90° as mentioned previously. In actual windings, the vertical angle at the vertex P is rendered slightly larger than the central angle described above to meet the need to offer a space in the center. However, calculation has shown that the component of force in the direction of rotation in a cup-shaped winding having the aforementioned vertical angle of 128° is inferior by only about 5.5% to a cup-shaped winding of an ideal design having the vertical angle of 90°.

Figure 9:
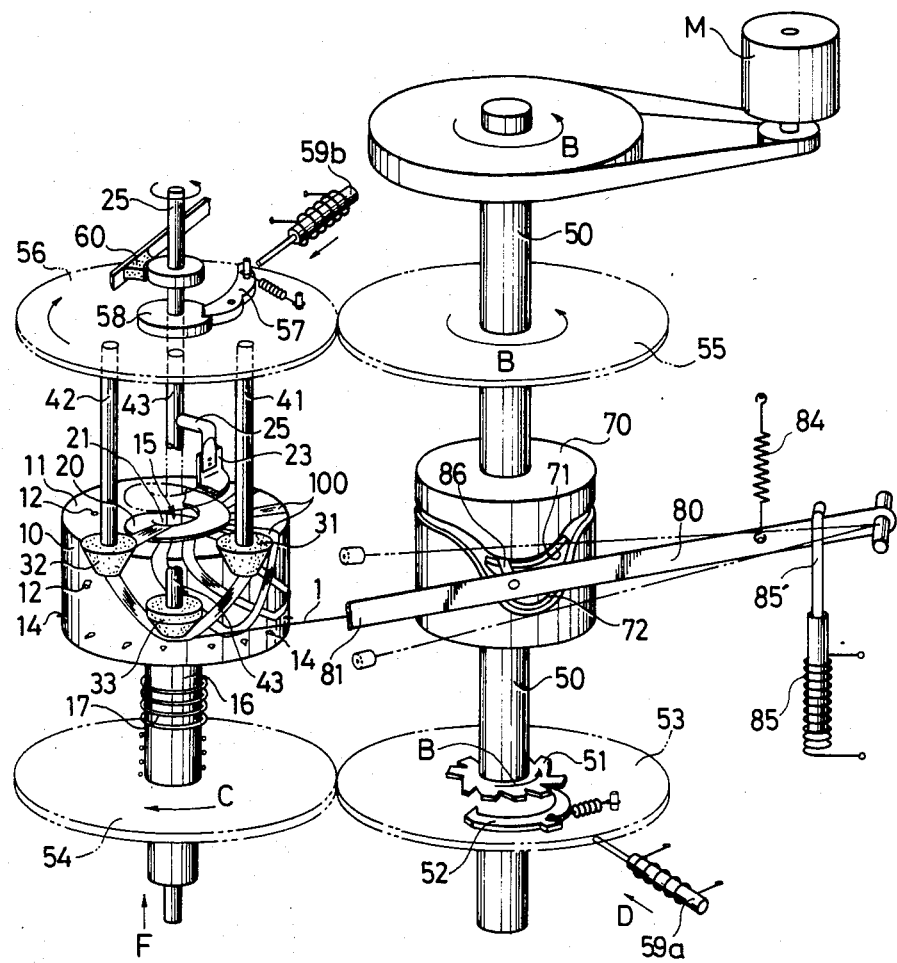
FIG. 9 is a schematic perspective view of an apparatus for fabricating a winding according to the invention.
Figure 10:
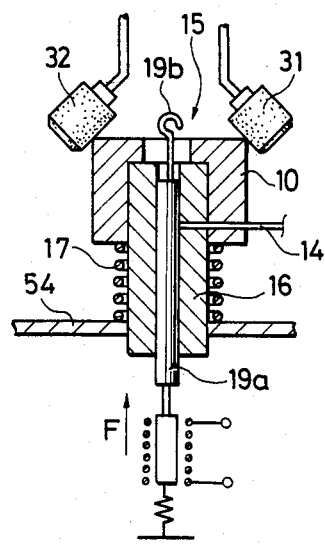
FIG. 10 is a vertical cross section of another apparatus for fabricating a winding according to the invention.

An apparatus for fabricating the cup-shaped winding 200 in which wires are wound in zigzag manner is next briefly described by referring to FIG. 9, where a core 10 on which wires are wound is cylindrical in shape. Because the core is cylindrical, the intermediate portions R of the winding, as shown in FIG. 8, are parallel to the central axis which passes through the rotating shaft. The taller the core, the greater the height of the winding with respect to the diameter of the winding. Conic rollers 31 and 32 abut against the fringe 11 of the bottom of the core 10. It is also possible to use a cylindrical roller in place of the conic rollers. In this alternative example, the cylindrical rollers are inclined and bear against the fringe 11 of the bottom of the core 10 as shown in FIG. 10. A cylindrical or conic roller 33 is pressed on the curved surface 12 of the cylinder 10 between the rollers 31 and 32. A spring 17 is mounted to surround a shaft 16 on which wire elements are wound, and it urges the core 10 upward so that the core 10 may be pressed on the conic rollers 31 and 32. A hole 15 is formed in the bottom 12 of the core 10 to permit external connection from taps. A spiral member 20 like a plate is located in the center of the core 10 and mounted below a crank shaft 25.

An intermediate shaft 50 extends parallel to the shaft 16 and is rotated by an electric motor M in the direction indicated by the arrow B. A cam 70 and toothed wheels 53, 55 are mounted to the intermediate shaft 50. The wheel 53 is in mesh with a toothed wheel 54 on the shaft 16 with 1:1 ratio. The wheel 55 is in mesh with a toothed wheel 56 with 1:1 ratio. The wheel 56 is mounted to the crank shaft 25 which is aligned with the shaft 16. The toothed wheel 53 is mounted to the intermediate shaft 50 so as to be rotatable about it. A ratchet 51 is affixed to the intermediate shaft 50 and is in mesh with a pawl member 52 which is pivotally mounted to the wheel 53 and biased toward the ratchet 51 by a spring. Thus, only when the intermediate shaft 50 rotates in the direction indicated by the arrow B, the wheel 53 rotates with the shaft 50.

Mounted to a toothed wheel 56 are the upper ends of roller shafts 41, 42, 43 on which the rollers 31, 32, 33 are rotatably mounted, respectively. The wheel 56 is rotatably mounted to the crank shaft 25. A ratchet 58 having one tooth is firmly secured to the crank shaft 25. A pawl 57 is pivotally mounted to the wheel 56 and biased toward the ratchet 58 by a spring. The pawl 57 engages with the ratchet 58, so that only when the wheel 56 turns in the direction indicated by the arrow C, the crank shaft 25 rotates with the wheel 56.

A cam 70 is generally shaped into a cylinder. A rock cam groove 71 and a tap groove 72 are formed in the outer periphery of the cam 70. The groove 72 branches downward from the groove 71 and then merges with the groove 71. A lever 80 is pivotally mounted so as to be swingable. A pin 86 is attached to the lever 80 and engages the grooves 71 and 72.

A guide nozzle 81 is formed at the front end of the lever 80. A wire element 1 which is paid out from a spool disposed in a suitable location passes through the lever 80 and the nozzle 81 and then it is fed to the core 10. Each time the core 10 rotates once, the nozzle 81 reciprocates once axially of the core 10. Since the lever 80 is urged upward by a spring 84, the pin 86 rocks along the rock cam groove 71. An operating rod 85' is disposed near the lever 80 and driven by a solenoid 85. When the solenoid 85 is energized, it pulls down the rod 85', which then shifts the lever 80 downward, moving the pin 86 into the branching tap groove 72.

A solenoid 59a acts to disengage the pawl member 52 from the ratchet 51. A further solenoid 59b brings the pawl 57 out of engagement with the ratchet 58. A brake means 60 serves to lightly or slightly brake the crank shaft 25.

The manner in which the cup-shaped winding 200 (FIG. 5 et seq.) is fabricated using the apparatus described above is now described. The intermediate shaft 50 is rotated by the motor M in the direction indicated by the arrow B. Then, the toothed wheels 53 and 55 are rotated in the same direction. This rotates the toothed wheels 54 and 56 together in the direction indicated by the arrow C. Then, the core 10 and the rollers 31-33 follow them and rotate in the same direction. Since the rotation of the intermediate shaft 50 is accompanied by rotation of the cam 70, the lever 80 makes a rocking movement along the cam groove 71. Thus, during one rotation of the core 10, the wire elememt 1 using a deposition line is trained around the roller 31, the spiral member 20, and rollers 32 and 33 to form a coil. These steps of operation are repeated several times to form the wire band 100 as described above.

It is possible to pull one coil downwardly from the others by energizing the solenoid 85 while the wire band 100 is being fabricated. The wire element 1 pulled out is brought into engagement with one of pins 14 mounted on the core 10, thus making an external connection from a tap.

After the completion of one wire band 100, an appropriate signal is applied to the solenoid 59b to energize it, disengaging the pawl 57 from the ratchet 58. Then, the rotation of the crank shaft 25 is stopped by the action of the brake 60, whereupon the core 10 still continues to turn. Therefore, the vertex P (FIGS. 7 and 8) of the wire band 100 comes out of engagement with the spiral member 20. Then, after one revolution of the toothed wheel 56, the pawl 57 again engages with the ratchet 58. Meanwhile, external connections from taps on the outer periphery and in the center are made. An external connection from the tap in the center is carried out in the manner described below. First, the wire element 1 is wound. At this time, it enters a notch 21, which is formed in the spiral member 20, from the roller 31, during which a tap takeout rod 19a is pushed out downwardly as indicated by the arrow F as shown in FIG. 10 by a solenoid or other means. Then, a hook 19b catches the wire element 1. Thereafter, the element 1 withdraws in the opposite direction.

After forming a single wire band 100 and making external connections from taps in this way, the next wire band 100 is forming such that it is shifted a given angle from the previous band 100. The spiral member 20 is shaped like a plate to prevent the axial thickness at the vertex P of the wire band from becoming large.

The wire bands 100 are angularly shifted from each other in the manner described below. A signal is applied to the solenoid 59a, so that it moves in the direction indicated by the arrow D (FIG. 9) and returns to its original position, disengaging the pawl member 52 mounted to the wheel 53 from the ratchet 51. Then, the ratchet 51 is allowed to be shifted one tooth in the direction indicated by the arrow B. As such, the mating gear 54 is delayed by one tooth of the ratchet 51 with respect to the toothed wheel 56 during rotation. As a result, the positions at which the rollers 31, 32, 33 bear against the core 10 are changed. Then, the wire element 1 is wound on the spiral member 20 and the rollers 31-33 to form one wire band 100 as described above. Subsequently, an external connection from a tap is made.

By repeating these operations, wire bands 100 are formed over 360° to complete the cup-shaped winding 200.

The fundamental cup-shaped winding according to the invention and the method of fabricating it have been described thus far. The following modified examples may also fall within the scope of the present invention.

Figure 11:
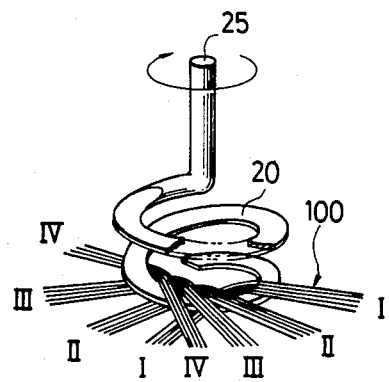
FIG. 11 shows the manner in which another spiral member for use in the method according to the invention is used.

(1) As shown in FIG. 11, the spiral member 20 is formed into a left-handed structure. The crank shaft 25 can be urged to rotate to disengage the spiral member 20 from wire bands 100 by an urging meams. After several sets of the wire band 100 as indicated by I-IV are caught by the spiral member 20, all can be disengaged from the spiral member at the same time by the aforementioned urging means.

Figure 12:
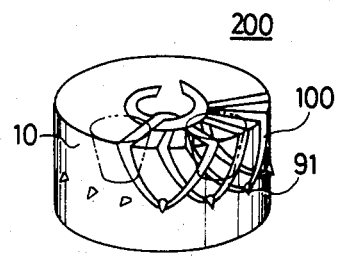
FIGS. 12 and 13 are perspective views of different cores for use in the method according to the invention, for showing the manner of usage.

(2) As shown in FIG. 12, a plurality of downwardly extending pins 91 are embedded in the curved surface of the core 10 so that these may act as means for retaining wire elements instead of the roller 33. If these pins 91 are shaped into a widened form, wire elements can be wound along the periphery on the opening portion. After coiling the cup-shaped winding 200, these pins 91 are withdrawn inwardly. This example is suitable for the case where the wire elements 1 are thick or the number of turns is large.

Figure 13:
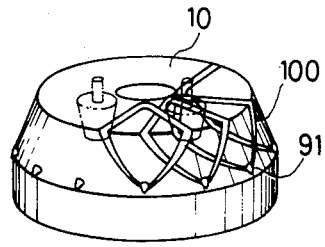

(3) The core may be a truncated cone as shown in FIG. 13 rather than a cylinder or disk. If the core is a truncated cone, then the winding will, of course, be in the shape of a truncated cone. In that event, the height of the winding will be less than the maximum diameter of the winding, which would correspond to the maximum diameter of the truncated cone. Also, of course, the more conical the shape of the core, the more conical the shape of the resulting winding, and so the greater the height of the winding with respect to the maximum diameter of the winding. In this case, the pins 91 are preferred over the roller 33 to retain the wire elements.

Figure 14:
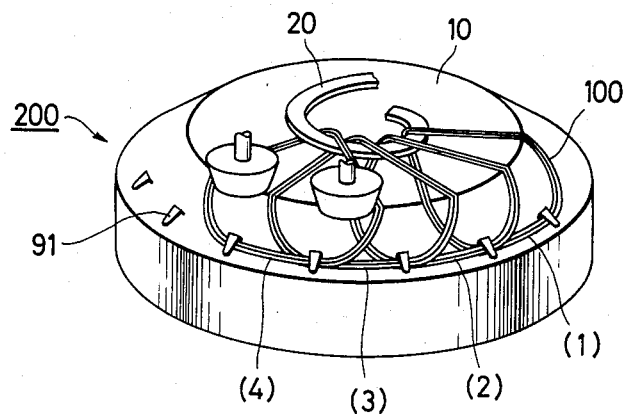

(4) As shown in FIG. 14, the wire elements may be caught on a plurality of retaining means or the pins 91 (wire elements are shown to be caught on two pins 91) during the winding operation.

Figure 15:
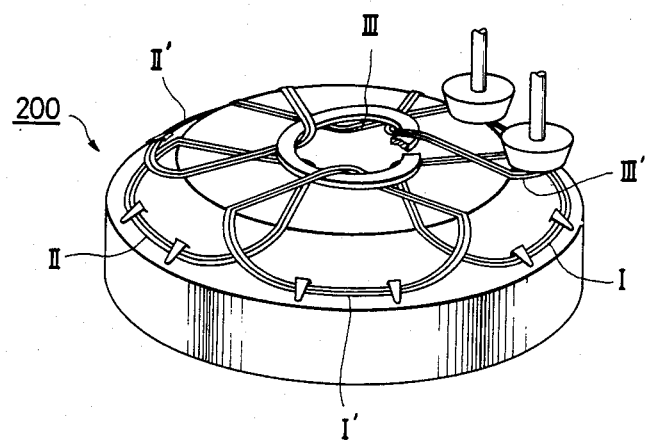

(5) As shown in FIG. 15, wire bands 100 may be arranged in a discrete manner as indicated by I, II, III (first revolution of the core), I', II', III' (second revolution of the core), etc. without requiring special connections.

Figure 16:
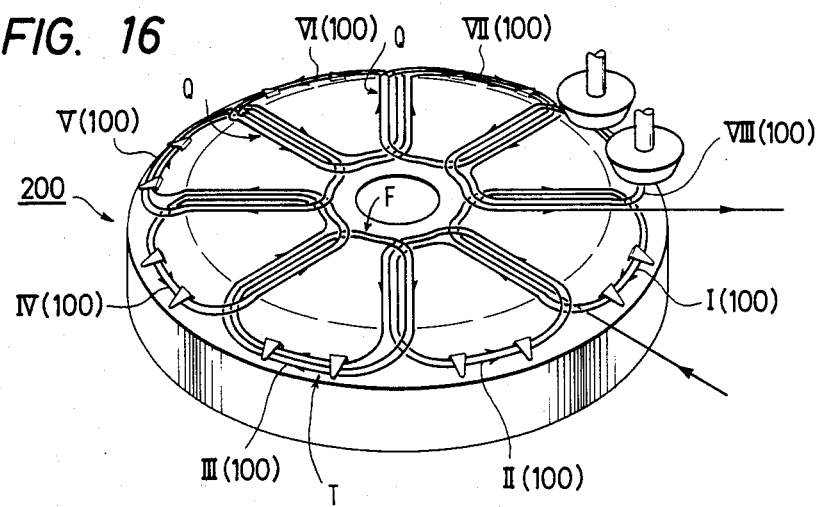
FIG. 16 is a schematic view of an alternative embodiment of the invention, showing a winding having a plurality of bands which are made of a single continuous wire element wound differently in winding directions.
Figure 17A:
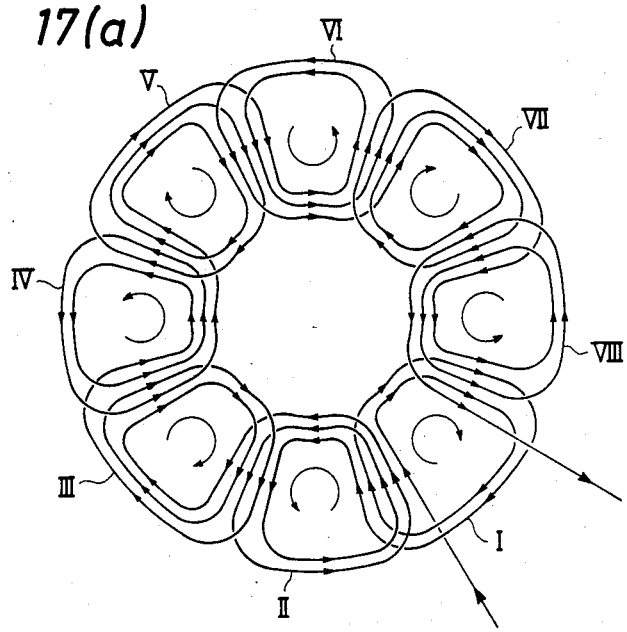
FIGS. 17(a) and (b) are illustrative of the winding manner of the bands shown in FIG. 16 and of a lapped state of the wound bands.
Figure 17B:
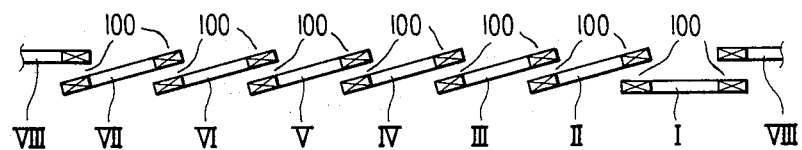

(6) As shown in FIGS. 16, 17(a), and 17(b), a winding for brushless 2 or 3 phase element winding wire bands 100 may be arranged in a manner as indicated by I, II, III, IV, V, VI, VII, VIII along the arrows with a phase difference of 180°. Namely, the adjacent wire elements are reversed in winding direction. In particular, FIG. 17(b) shows how the wire bands I-VIII in this embodiment lie on top of one another in forming the overall cup-shaped winding. Thus, respective continuous bands are formed in alignment with each other. In this case, a series of wire bands may be automatically formed of a single wire element without medding to connect the element bands manually to each other. In this embodiment, as shown particularly in FIGS. 16 and 17(a), instead of the two sides Q in each wire band being connected at a vertex P, a fourth side F connects the sides Q. The intermediate portions R are not present in this embodiment. The fourth side F is positioned on the bottom portion of the winding, a predetermined radial distance away from the central axis of the winding, as is the case with the vertices P in the embodiment which is shown in greatest detail in FIGS. 7 and 8. The two sides Q are inclined with respect to the central axis of the winding in this embodiment. The third side T still lies along a curved surface of the winding, in order to form the "lip" of the cup which constitutes the shape of the overall winding. This makes it easy to manufacture the winding, by eliminating the connecting process and assures good conductivity.

Since the novel cup-shaped winding is constructed as described above, it corresponds to the magnetic flux in the main direction of the field and leakage flux by placing two sides Q of each wire band on the periphery of the rotating shaft, thus enhancing the winding factor K. Also, since wire elements can be arranged closely in parallel relation to form wire bands, the overall thickness can be made small. Further, the line density can be increased, and the air gap can be narrowed to increase the magnetic flus density in the gap. Hence, the length of each coil of the wire band can be reduced, thereby decreasing the line resistance. Consequently, the rotating force and the efficiency of rotation can be improved. Furthermore, the present invention enables a winding to be efficiently manufactured by combining a cylindrical, disklike, or truncated-conic core with a retaining means such as a spiral member, rollers, or pins.

What is claimed is:

1. A cup-shaped winding comprising:
   a plurality of wire bands, each of which consists of a plurality of turns of wire,
   each of said wire bands being successively shifted a given angle from each other about a central axis extending axially through a rotating shaft of the winding,
   two sides, a third side, and intermediate portions of the wire bands being formed on a bottom portion, an opning portion, and a curved surface, respectively, of the winding,
   a portion of each wire band whic is on the bottom portion not surrounding the central axis and forming said two sides that are spaced at a given angle with respect to each other, and which meet at a vertex lying at a predetermined radial distance from said central axis,
   said intermediate portions lying between said two sides and said third side to form the overall cup shape of the winding.

2. A cup-shaped winding as set forth in claim 1, wherein the wire bands each consisting of a plurality of turns of wire element are lap wound in such a way that said wire bands are successively shifted a predetermined angle from each other about the central axis of the winding.

3. A cup-shaped winding as set forth in claim 1, wherein the wire bands each consisting of a plurality of turns of wire are spaced apart a multiple of a predetermined angle.

4. A cup-shaped winding as set forth in claim 1, wherein said intermediate portions are parallel to said central axis.

5. A cup-shaped winding as set forth in claim 4, wherein said cup-shaped winding has a shape that is substantially cylindrical, a height of said shape being greater than a diameter of said shape.

6. A cup-shaped winding as set forth in claim 4, wherein said cup-shaped winding has a shape that is substantially cylindrical, a height of said shape being smaller than a diameter of said shape, whereby said cup-shaped winding is substantially flat.

7. A cup-shaped winding as set forth in claim 1, wherein said intermediate portions are inclined away from said central axis, said cup-shaped winding having a shape that is substantially conical, a height of said shape being greater than a maximum diameter of said shape.

8. A cup-shaped winding as set forth in claim 7, wherein said intermediate portions are inclined away from the central axis, said cup-shaped winding having a shape that is substantially conical, a height of said shape being less than a maximum diameter of said shape.

9. A cup-shaped winding as set forth in claim 1, wherein said plurality of wire bands are formed with a single wire element.

10. A cup-shaped winding as set forth in claim 9, wherein adjacent ones of said plurality of wire bands are wound in opposite directions around said core.

11. A cup-shaped winding comprising:
    a plurality of wire bands, each of which consists of a plurality of turns of wire, said bands being spaced apart a multiple of a predetermined angle about a central axis which extends axially through a rotating shaft.
    two sides, a third side, and intermediate portions of the wire bands being formed on a bottom portion, an opening portion, and a curved surface, respectively, of the winding,
    a portion of each wire band which is on the bottom portion not surrounding the central axis and forming said two sides that are spaced at a given angle with respect to each other, and which meet at a vertex lying on a periphery of the central axis, said intermediate portions lying between said two sides and said third side to form the overall cup shape of the winding.

12. A cup-shaped winding as claimed in claim 1, wherein said plurality of wire bands are wound sequentially in successive layers, each of said layers containing at least two of said wire bands, bands in a first one of said layers being overlapped by second and subsequent ones of said layers by a multiple of a predetermined angle.

13. A cup-shaped winding comprising:
    a plurality of wire bands, each of which consists of a plurality of turns of wire, said bands being spaced apart a multiple of a predetermined angle about a central axis which extends axially through a rotating shaft,
    two sides and a third side of the wire bands being formed on a bottom portion and an opening portion, respectively, of the winding,
    the winding further comprising a fourth side connecting said two sides and lying along a bottom portion of the winding at a predetermined radial distance from said central axis,
    a portion of each wire band which is on the bottom portion not surrounding the central axis and forming said two sides that are spaced at a given angle with respect to each other, and which are connected with said fourth side.

* * * * *